(12) United States Patent
Brosius, III

(10) Patent No.: US 9,482,758 B2
(45) Date of Patent: **\*Nov. 1, 2016**

(54) SYSTEM AND METHOD FOR USING DATA PHASE TO REDUCE POSITION AMBIGUITIES

(71) Applicant: SkyBitz, Inc., Herndon, VA (US)

(72) Inventor: John W. Brosius, III, Frederick, MD (US)

(73) Assignee: SkyBitz, Inc., Herndon, VA (US)

( * ) Notice: Subject to any disclaimer, the term of this patent is extended or adjusted under 35 U.S.C. 154(b) by 97 days.

This patent is subject to a terminal disclaimer.

(21) Appl. No.: 14/049,294

(22) Filed: Oct. 9, 2013

(65) Prior Publication Data

US 2014/0038638 A1    Feb. 6, 2014

Related U.S. Application Data

(63) Continuation of application No. 13/492,312, filed on Jun. 8, 2012, now Pat. No. 8,558,737, which is a continuation of application No. 12/399,389, filed on Mar. 6, 2009, now Pat. No. 8,217,838.

(60) Provisional application No. 61/038,116, filed on Mar. 20, 2008.

(51) Int. Cl.
*G01S 19/12* (2010.01)
*G01S 5/00* (2006.01)
*G01S 19/50* (2010.01)

(52) U.S. Cl.
CPC .............. *G01S 19/12* (2013.01); *G01S 5/0036* (2013.01); *G01S 19/50* (2013.01)

(58) Field of Classification Search
USPC ............ 342/357.21, 357.26, 357.33, 357.41, 342/357.43, 457, 458; 701/412
See application file for complete search history.

(56) References Cited

U.S. PATENT DOCUMENTS

| | | |
|---|---|---|
| 5,442,363 A | 8/1995 | Remondi |
| 5,955,986 A | 9/1999 | Sullivan |
| 6,094,162 A | 7/2000 | Sullivan |
| 6,154,171 A | 11/2000 | Sullivan |
| 6,169,514 B1 | 1/2001 | Sullivan |
| 6,243,648 B1 | 6/2001 | Kilfeather et al. |
| 6,480,788 B2 | 11/2002 | Kilfeather et al. |
| 6,535,163 B1 | 3/2003 | Sahai et al. |
| 6,560,536 B1 | 5/2003 | Sullivan et al. |
| 6,725,158 B1 | 4/2004 | Kilfeather et al. |

*Primary Examiner* — Dao Phan
(74) *Attorney, Agent, or Firm* — Toering Patents PLLC

(57) ABSTRACT

A geographic tracking system with minimal power and size required at the mobile terminal collects observation data at the mobile terminal and forwards the data to a processor, which calculates the position. The mobile terminal is configured to measure both code phase and data phase of a GPS satellite signal. The code phase and data phase information enables the processor to reduce the number of candidate points to be considered.

20 Claims, 5 Drawing Sheets

SYSTEM AND METHOD FOR USING DATA PHASE TO REDUCE POSITION AMBIGUITIES

This application is a continuation of non-provisional patent application Ser. No. 13/492,312, filed Jun. 8, 2012, which is a continuation of non-provisional patent application Ser. No. 12/399,389, filed Mar. 6, 2009, which claims priority to provisional application No. 61/038,116, filed Mar. 20, 2008. Each of the above-identified applications are incorporated by reference herein, in its entirety, for all purposes.

BACKGROUND

1. Field of the Invention

The present invention relates generally to tracking and monitoring and, more particularly, to a system and method for using data phase to reduce position ambiguities.

2. Introduction

Tracking mobile assets represents a growing enterprise as companies seek increased visibility into the status of movable assets (e.g., trailers, containers, etc.). Visibility into the status of movable assets can be gained through mobile terminals that are affixed to the assets. These mobile terminals can be designed to generate position information that can be used to update status reports that are provided to customer representatives.

In one conventional system, a mobile terminal is designed to collect observation data and forward the observation data to a central location. Position calculations can then be performed at the central location rather than at the mobile terminal. Since the mobile terminal need only be active long enough to gather the observation data, the mobile terminal experiences minimal battery drain. In this environment, what is needed is a mechanism that improves processing efficiency at the central location in performing the mobile terminal position calculation.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
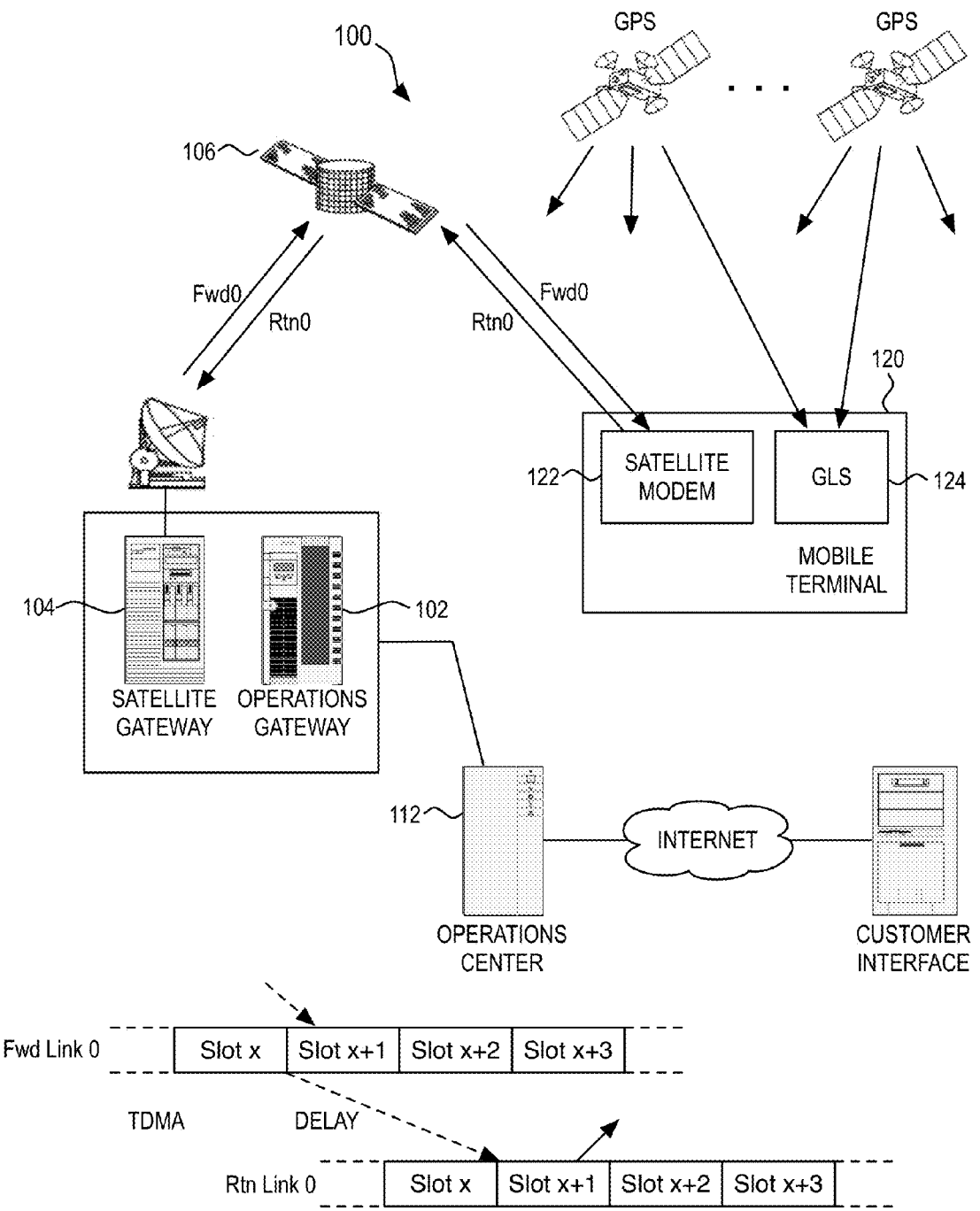
FIG. 1 illustrates an embodiment of a satellite network in communication with a mobile terminal on an asset.

FIG. 1 illustrates an embodiment of an asset tracking system that includes operations gateway 102, communicating with mobile terminal (MT) 120 on an asset (or asset transporter). As would be appreciated, the asset can be embodied in various forms such as a trailer, a railcar, a shipping container, or the like.

Communication between operations gateway 102 and MT 120 is facilitated by satellite gateway 104 at the ground station and satellite modem 122 in MT 120. Both satellite gateway 104 and satellite modem 122 facilitate communication using one forward and one return link (frequency) over communication satellite 106.

In one embodiment, the satellite communication is implemented in a time division multiple access (TDMA) structure, which consists of 57600 time slots each day, per frequency or link, where each slot is 1.5 seconds long. On the forward link, operations gateway 102 sends a message or packet to MT 120 on one of the 1.5 second slots. Upon receipt of this message or packet, MT 120 would then perform a GPS collection (e.g., code phase measurements) using global locating system (GLS) module 124 or to perform sensor measurements and transmit the data back to operations gateway 102 on the return link, on the same slot, delayed by a fixed time defined by the network. In one embodiment, the fixed delay defines a length of time that enables MT 120 to decode the forward packet, perform the data collection and processing, and build and transmit the return packet.

In one embodiment, MT 120 can be configured to produce periodic status reports. In this configuration, MT 120 would wake up periodically, search for its assigned forward slot, perform data collection and processing, and transmit the status report on the assigned return slot. In another embodiment, MT 120 can be configured to produce a status report upon an occurrence of an event (e.g., door opening, motion detected, sensor reading, etc.). In this configuration, MT 120 would wake up upon occurrence of an event, search for an available forward slot, perform data collection and processing, and transmit the status report on the return slot corresponding to the identified available forward slot.

Upon receipt of a status report from MT 120, operations gateway 102 passes the information to operations center 112. Operations center 112 can then use the received GPS collection to calculate a position solution. This position solution along with any other status information (both current and historical) can be passed to a customer via the Internet.

As generally described, the calculation of the position of MT 120 is based on the transmission of measurement data taken by MT 120. While these measurements are inherently ambiguous, they can be used in combination with satellite range information to calculate an actual position of MT 120. A more detailed description of this process is now provided.

In one example, MT 120 can initiate a position report in response to a gateway request packet sent to it. MT 120 can obtain information on preferred satellites from the forward packet or gateway-broadcast information. Here, MT 120 would note the precise timing of the forward (inbound or gateway-to-MT) packet and schedule a position data collection and data reporting from this time. MT 120 would then detect GPS satellites in view by detecting the presence of radio energy at a GPS frequency using spreading codes specific to each GPS satellite.

MT 120 detects the timing offsets for each code relative to a baseline, which could be, for example, the time of measurement for any of the satellites' signal. After precise measurement, MT 120 encodes a return packet with the measured offsets for the code of each GPS satellite observed and sends the packet to the gateway at a specific time offset from receipt of the forward packet.

The round trip time for the MT's response to the forward packet transmission can be determined by subtracting known MT processing and scheduling delays, thereby resulting in a round trip time for the query-response transaction with MT 120. If MT 120 sent an unsolicited position report, the packet sent in the forward timeslot corresponding to the timeslot containing the position report can be used as the start time for the round trip time measurement.

Figure 2:
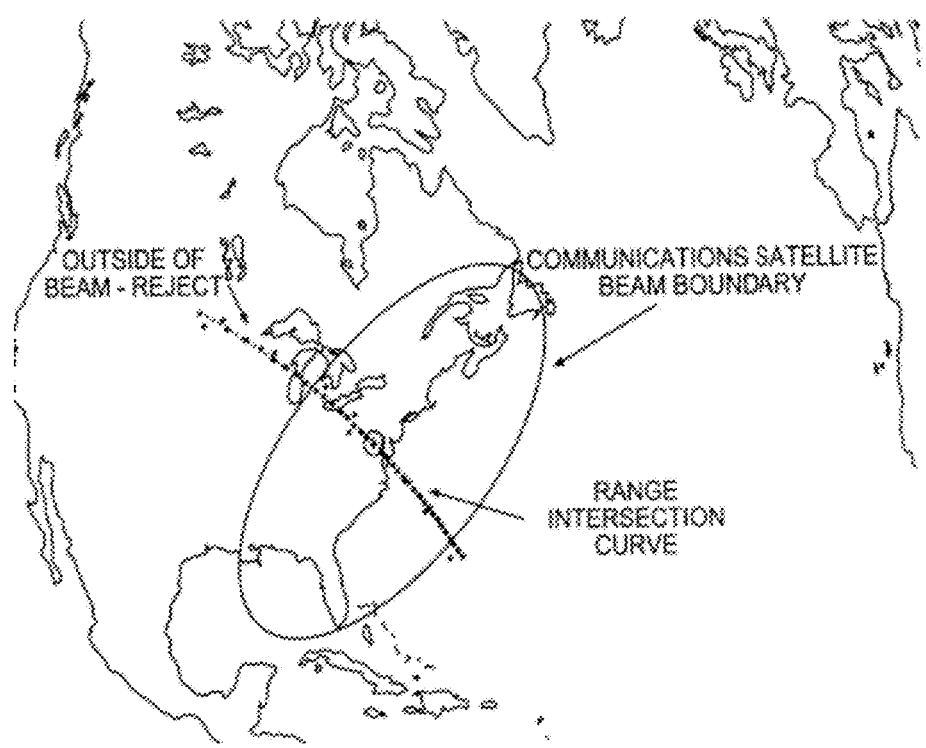
FIGS. 2 and 3 illustrates a geographical representation of an intersection curve.

Using the determined round trip time, operations center 112 can then calculate a range distance from communication satellite 106 to MT 120. This range distance can be used to identify the outside boundaries of a satellite beam in which MT 120 is operating. The intersection of these outside boundaries with the surface of the earth represents a range intersection curve. An example of such a range intersection curve is illustrated in FIG. 2. This range intersection curve generally represents the potential position of MT 120 within the satellite beam boundary.

Figure 3:
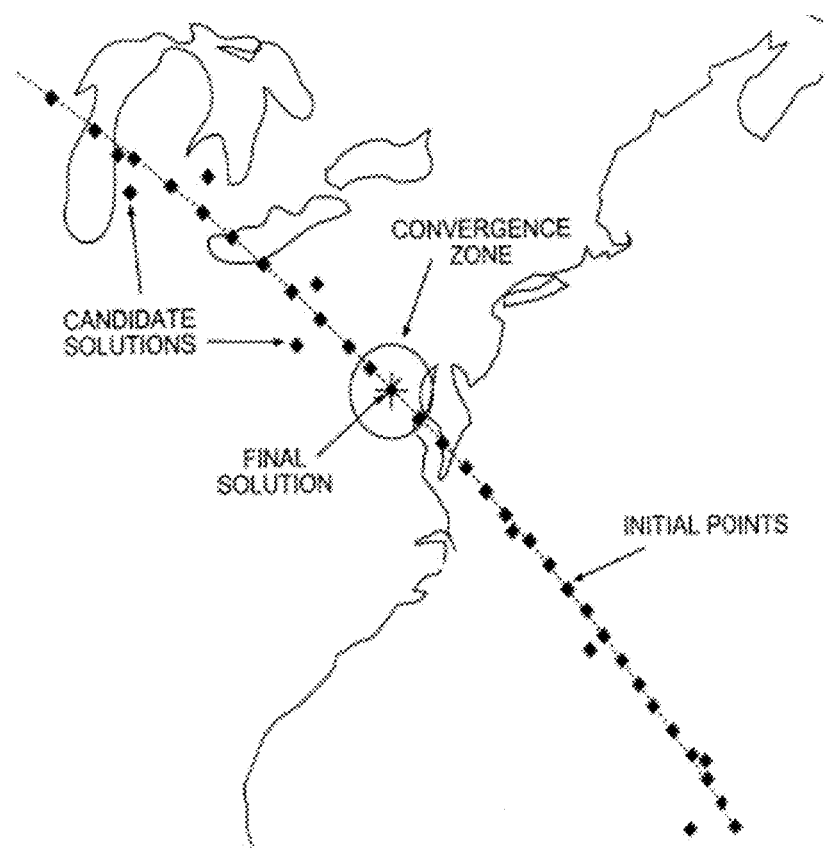

As illustrated in FIG. 3, operations center 112 can arbitrarily calculate several seed positions along the range intersection curve and use those seed positions as initial start points in an iterative calculation process that calculates the closest point for which the reported code offsets from MT 120 would all apply. Here, a code offset would apply if the determined point was consistent with a distance from the GPS satellite represented by the transfer time needed to produce the code phase offset plus N multiples of the code. As would be appreciated, substantial computing power would be needed to perform the iterative calculations for a plurality of initial start points. The greater the number of initial start points, the greater amount of processing resources would be required.

Several candidate solutions can result from this calculation process within the area of operations. If more than one candidate solution results, the candidate solution with the best attributes is chosen as the final position of MT 120. Attributes could include the solution's distance to the range intersection curve calculated above, vertical distance from the known earth's surface elevation at the resulting points, mathematical residuals (measure of disagreement among multiple line crossings defining a solution position) for the solved point, etc. A detailed description of this communications process is provided in U.S. Pat. No. 6,243,648, entitled "Fast Acquisition Position Reporting System," which is incorporated herein by reference in its entirety.

GPS signals are modulated with known fast sequences so that this detailed time structure can be used to resolve time differences very precisely. But this detailed time structure—or rapid signal variation—also spreads the signal over a correspondingly broad band of frequencies. GPS signals travel a long distance from satellite to earth and are therefore weak at the earth's surface. Spread GPS signals are typically below the ambient background noise for a receiver with an omni-directional antenna. Therefore, such GPS receivers must integrate (collect and sum) the GPS signal for at least around one millisecond to gather enough energy to cause it to exceed the noise and become detectable.

The spreading code used by each GPS satellite is a rapid series of random-appearing but reproducible signal inversions, one of two possible values, a new choice occurring every 0.977 microseconds, or 1,023 times per millisecond. Each of these successive 1,023 states is known as a chip. Each GPS satellite uses a different sequence of chips, or spreading code. Merely summing the received signal with these chips for a millisecond in an effort to collect enough energy to detect it would result in a signal energy value near zero, since the codes are chosen to have approximately the same number of each of two opposite values. The GPS signal would remain undetectable in this event.

Squaring the signal would permit summing the signal's energy and detecting it. However, it would also forfeit knowledge of signal timing. Alternatively, adding a sequence identical to the spreading sequence and synchronizing it to the received signal, chip for chip, changes all chips to the same value under the rules of binary arithmetic. With the same value at every chip, there is no longer any fine time structure or chip variation, hence there is no longer any signal spreading. The signal energy consequently concentrates in a much narrower band, becomes prominent above the background noise, and thereby becomes detectable.

The GPS spreading code sequences used by civilian receivers reset (start over again) every millisecond. That is, the same place in the sequence will recur in a received signal at times that are exactly an integer number of milliseconds before or after the time at which the measurement was taken, indefinitely. Since radio waves travel at approximately $3 \times 10^8$ meters per second, this means that points around 300 kilometers apart along the path taken by the signal from the GPS satellite will show the same code delay value at any given time. This means that a detected code phase value yields an ambiguity in finding a position on the earth for which a given code delay value could have been seen. In many cases, positions at intervals of several hundred kilometers separation on the earth will show the same measurement value.

Hence, code phase, the distance through the code sequence, can be considered the rotational angle of a rotating vector, which completes one rotation every one millisecond. Its rotation angle is otherwise known as the phase of the rotating vector.

GPS satellites also add a 50 bit per second data stream to the transmitted spreading codes. This data contains information on the position of the GPS satellites and other data useful for position calculations. Data transitions, occurring every 20 milliseconds, are synchronized to the spreading codes such that a data transition occurs precisely at the time of a spreading code reset, which themselves occur every one millisecond.

A data transition, when it occurs, causes the spreading code to invert. This inversion in turn can forestall integration if it occurs during an integration period, the same way chip inversions prevent integration. So GPS receivers, if they integrate for periods exceeding one millisecond, must determine if and where a data inversion occurs and remove its effect from the integration process. Data phase, the interval from the last transition (or to the next) can also be considered as the rotational angle, or phase, of a rotating vector, which completes a rotation every 20 milliseconds.

As described above, a GPS receiver integrating a civilian use GPS CA signal coherently for more than one millisecond must detect and eliminate data transitions, since a data transition could occur at any one-millisecond boundary. This can be done by either observing when a millisecond's integration inverts, or, if multiple milliseconds are being integrated (added) together, finding which trial data transition time yields the highest integration value, since any inversion not immediately compensated will cause a subtraction rather than an addition in the integration process. Unlike spreading codes, data is not known in advance, so local data sequences of all possible bit combinations must be run against the received signal for each candidate data phase to find that which yields the best integration.

It is a feature of the present invention that the detected data phase can also be used for calculating an MT position. As described above, MTs can be configured to send code phase measurement values back to the operations center. These code phase measurement values can be represented as $\{c_1, c_2, c_3, c_4, c_5, \ldots c_s\} = \{c\}$, where s is the number of GPS satellites observed by the MT. Each code phase observation value $c_i$ is an observation characteristic that can correspond to scores of positions distributed in two dimensions all over the possible area of operation (assuming limiting solutions to the surface of the earth, otherwise even more over three dimensions). As noted, the measurement of round trip time via the communications satellite can be used to reduce these possible positions to a set of those that must also lie on a range intersection curve on the earth corresponding to the measured communications satellite round trip time measured during the position request-reply transaction with the MT.

In accordance with the present invention, the MT is also configured to include data phase measurements $\{d_1, d_2, \ldots d_s\} = \{d\}$ accompanying code phase measurements $\{c\}$ for the satellites 1 ... s. Given a satellite observation for which both code and data phase is available, the operations center calculation may be constrained to limit the candidate positions to those where the code phase value $c_i$ would correspond to a position where both measurement $c_i$ and measurement $d_i$ would be seen. This reduces the candidate positions by a factor of 20, since data phase transitions occur only $\frac{1}{20}^{th}$ the rate of code phase repeats, and only one in every 20 code phase repeats will correspond to an observed data phase transition. This significant reduction would produce large savings in the computation resources needed at the operations center.

Using the two data elements for a satellite observation, a value for code phase $c_i$ and a value for data phase $d_i$, the operations center is then able to reduce possible positions corresponding to these two simultaneous observations to only those occurring every 6,000 kilometers (or ~3,728 miles) along the path from the satellite i to the area of mobile operations. Due to this significant reduction in possible positions, there is most likely only one such position matching both these parameters that is within the area of mobile operations, as described by a satellite beam outline in FIG. 2. Hence, the position determination can now prioritize the candidate positions along the range intersection curve, giving highest priority to that position closest to those points described by the condition of matching both $c_i$ and $d_i$ simultaneously. It should be noted that no heed of any information content in the data stream from the satellite is taken by the mobile terminal in extracting or reporting any $d_i$.

Figure 4:
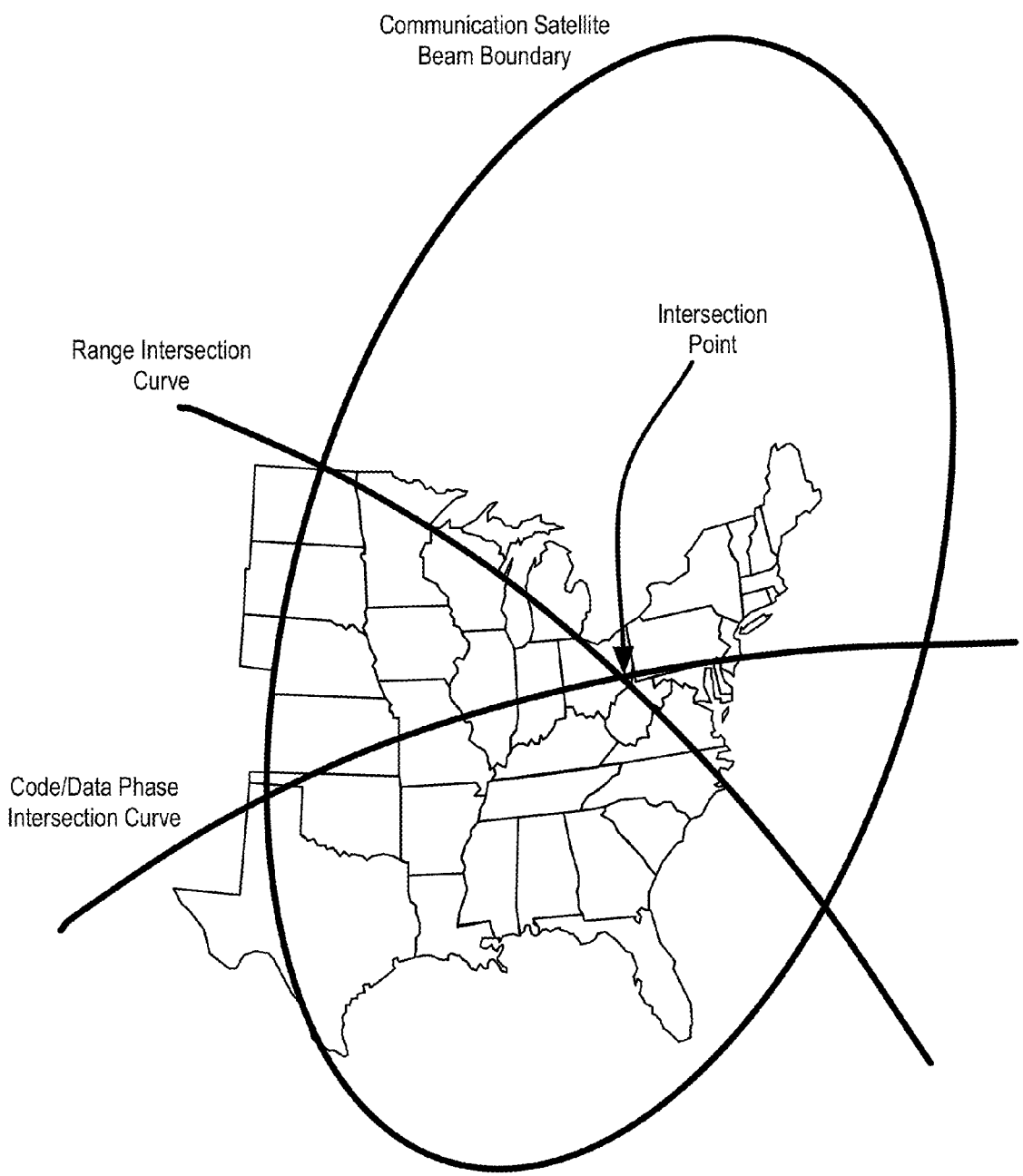
FIG. 4 illustrates a geographical representation of an intersection point between intersection curves.

In effect, therefore, since the operation center knows from various other sources the predicted positions of the GPS satellites at the time of the mobile terminal's measurement of $\{c\}$ and $\{d\}$, the operations center can create a second arc of intersection with the earth's surface corresponding to points for which the measured values of the two parameters code phase $c_i$ and data phase $d_i$ would apply. FIG. 4 illustrates the intersection of this second arc of intersection (labeled Code/Data Phase Intersection curve) with the range intersection curve based on the communication satellite range measurement. The intersection point of these two intersection curves would then serve to identify an initial position point from which the final solution process proceeds. Significantly, the position determination process of the present invention would no longer need to treat all candidate points on the range intersection curve as equally likely. This is due to the fact that the intersection point between the two intersection curves has a higher a posteriori probability of being near the true position of the MT than the other candidate points on the range intersection curve.

It should be noted that a code phase and data phase report from one GPS satellite will likely be sufficient to determine a final position of the MT. If the MT is able to return a data phase measurement for more than one GPS satellite, then the technique described above can be applied again to such other GPS satellite(s) to create additional code/data intersection curves for further validating and refining the candidate MT position for final position processing.

To implement the advantages above of sending data phase with code phase, the MT need only send a 5-bit binary integer value for each $c_i$ to identify how far along in the sequence of one-millisecond correlations the data phase was discovered. If the MT sends code phase for a number of satellites equal to or greater than a number "k" equaling 5 or 6, it need not send data phase, since it has enough code phase observations for a good solution using only those observations. If, however, it is unable to measure code phases for at least k satellites, but only for some lesser number j<k, space allowed in the data packet for the unreported code phases for the remainder of satellites (k−j) may be used for reporting data phase. Since code phase integers require at least three times the space required for data phase integers, the MT may allocate one code phase field for reporting the data phase for at least three satellites. Hence data phase reporting is efficient.

Figure 5:
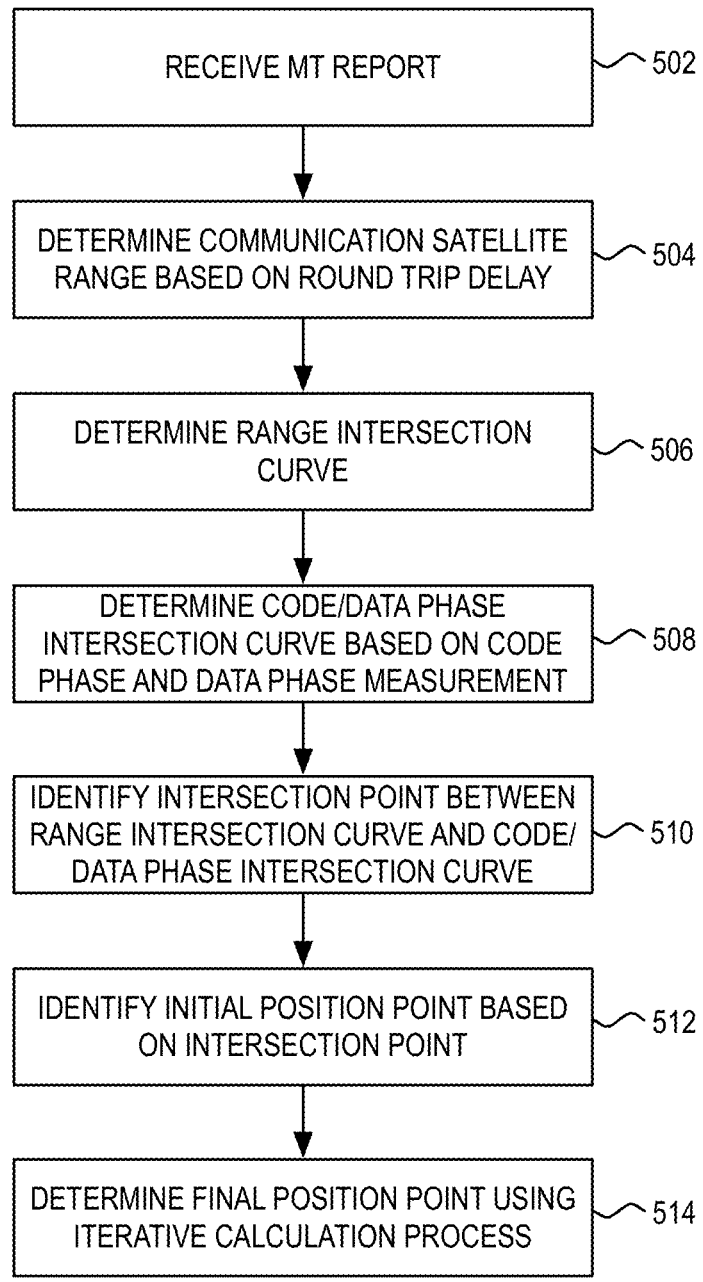
FIG. 5 illustrates a flowchart of a process of the present invention.

To further illustrate the features of the present invention reference is now made to the flowchart of FIG. 5. As illustrated, the process begins at step 502 where the operations center receives an MT report. As noted, in one example, this MT report may have resulted from a request sent to the MT. At step 504, based on the received MT report, the operations center then determines a range distance from the communication satellite to the MT based on the round trip delay of the communication to/from the MT. This range distance is then used to generate a range intersection curve with the earth surface at step 506.

The MT report received by the operations center also includes code phase and data phase measurement data generated by the MT. With the code phase and data phase for a particular GPS satellite, the operations center can generate a code/data phase intersection curve at step 508. As noted, the inclusion of a data phase measurement for a GPS satellite serves to reduce the number of possible range distances to that particular GPS satellite. Without the data phase measurement, the possible distances between the MT and the GPS satellite would be the distance the signal would travel during a transfer time represented by the code phase offset (i.e., fraction of one millisecond) plus any N multiples of the code (i.e., one millisecond). In other words, the possible distances would be spaced 300 km apart (i.e., the distance the signal would travel in one millisecond). With the data phase measurement, on the other hand, the possible distances between the MT and the GPS satellite would be the distance the signal would travel during a transfer time represented by the code phase offset plus any 20*N multiples of the code. In other words, the possible distances would be spaced 6000 km apart (i.e., the distance the signal would travel in 20 milliseconds).

Most likely, there is only one distance that satisfies both the code phase and data phase measurement in the area corresponding to the satellite beam boundary. This distance can be used to generate a code/data phase intersection curve on the surface of the earth.

At step 510, the intersection of the range intersection curve and the code/data phase intersection curve is identified. An initial position point is then identified based on the intersection point at step 512. This initial position point is then used in an iterative calculation process that calculates the closest point for which the reported code/data offsets from MT 120 would all apply.

As has been described, the identification of the intersection point yields significant computational savings because multiple seed points for the iterative calculation process need not be used. Rather, a single initial position point based on the intersection point would be guaranteed to converge to the final position of the MT.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
    identifying an initial position point on a range intersection curve that is consistent with a code phase measurement and a data phase measurement of a positioning satellite signal that is taken by a mobile terminal; and
    performing an iterative calculation process on the initial position point to produce a final position solution for the mobile terminal.

2. The method of claim 1, wherein the determining is performed by a service operation center.

3. The method of claim 2, wherein the code phase measurement and the data phase measurement are provided to the service operation center using a communication satellite transmission by the mobile terminal.

4. The method of claim 1, wherein the performing comprises performing using a plurality of code phase measurements for a respective plurality of positioning satellite signals.

5. The method of claim 1, wherein the positing satellite signal is a GPS satellite signal.

6. The method of claim 1, wherein the performing comprises performing on only the initial position point.

7. The method of claim 1, wherein the initial position point is on the range intersection curve.

8. A system, comprising:
    one or more circuits that enable determination of a location of a mobile terminal, the one or more circuits being operable to:
        identify an initial position point on a range intersection curve that is consistent with a code phase measurement and a data phase measurement of a positioning satellite signal that is taken by the mobile terminal; and
        perform an iterative calculation process on the initial position point to produce a final position solution for the mobile terminal.

9. The system of claim 8, wherein the code phase measurement and the data phase measurement are provided to the system using a communication satellite transmission by the mobile terminal.

10. The system of claim 8, wherein the one or more circuits are configured to perform the iterative calculation process using a plurality of code phase measurements for a respective plurality of positioning satellite signals.

11. The system of claim 8, wherein the positing satellite signal is a GPS satellite signal.

12. The system of claim 8, wherein the one or more circuits are configured to perform the iterative calculation process on only the initial position point.

13. The system of claim 8, wherein the initial position point is on the range intersection curve.

14. A non-transitory machine-readable storage having stored thereon, a computer program having at least one code section for determining a location of a mobile terminal, the at least one code section being executable by a machine for causing the machine to perform steps comprising:
    identifying an initial position point on a range intersection curve that is consistent with a code phase measurement and a data phase measurement of a positioning satellite signal that is taken by the mobile terminal; and
    performing an iterative calculation process on the initial position point to produce a final position solution for the mobile terminal.

15. The non-transitory machine-readable storage of claim 14, wherein the code phase measurement and the data phase measurement are provided using a communication satellite transmission by the mobile terminal.

16. The non-transitory machine-readable storage of claim 14, wherein the performing comprises performing using a plurality of code phase measurements for a respective plurality of positioning satellite signals.

17. The non-transitory machine-readable storage of claim 14, wherein the positing satellite signal is a GPS satellite signal.

18. The non-transitory machine-readable storage of claim 14, wherein the performing comprises performing on only the initial position point.

19. The non-transitory machine-readable storage of claim 14, wherein the initial position point is on the range intersection curve.

20. The non-transitory machine-readable storage of claim 14, wherein the identifying comprises identifying using a second intersection curve that is identified using the code phase measurement and the data phase measurement.

* * * * *